Patented Mar. 23, 1937

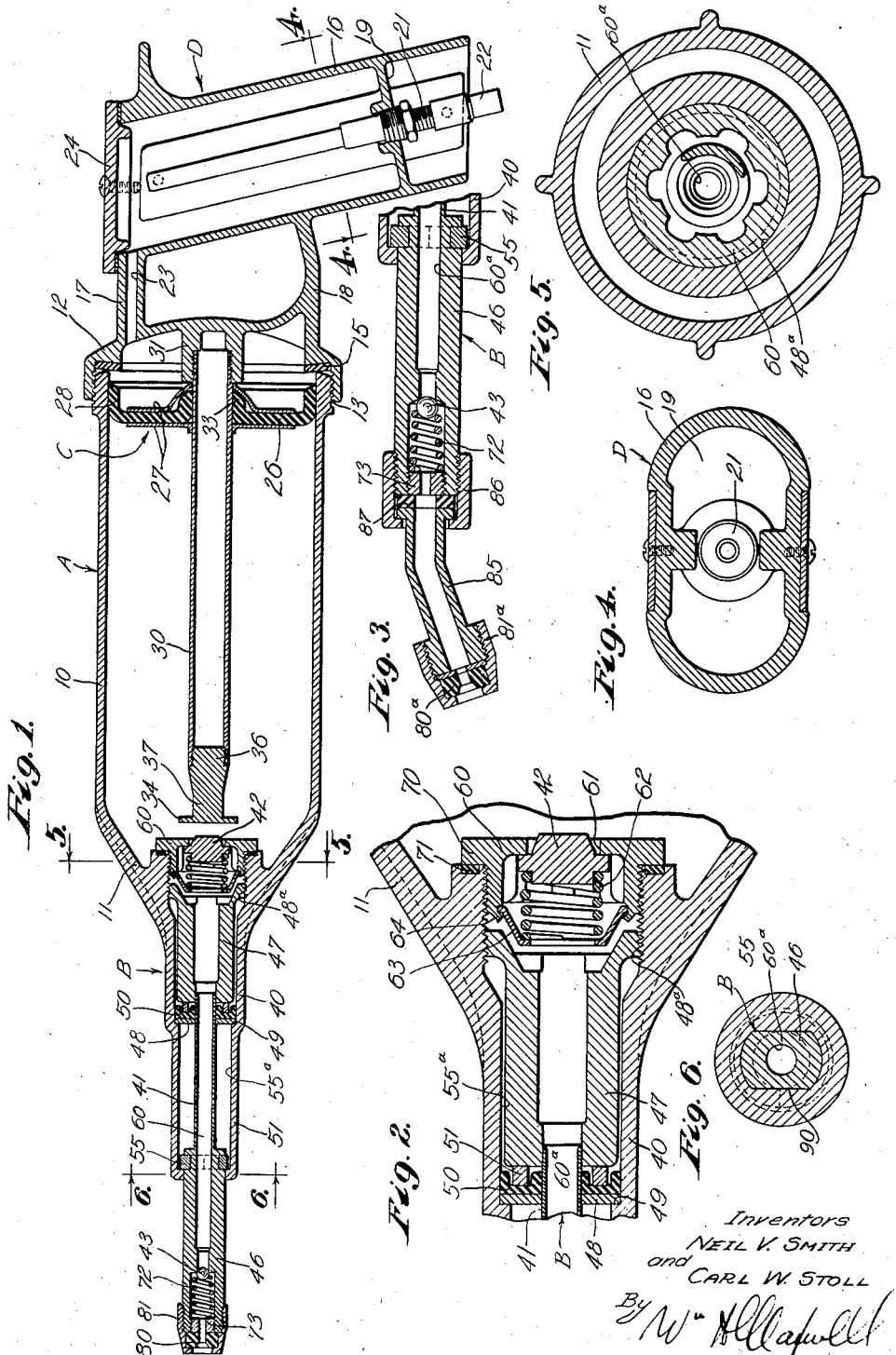

2,074,570

UNITED STATES PATENT OFFICE 2,074,570

GREASE GUN

Neil V. Smith and Carl W. Stoll, Los Angeles, Calif., assignors to Smith-Johnson Corporation, Los Angeles, Calif., a corporation of California Application August 23, 1935, Serial No. 37,567

7 Claims. (Cl. 221—47.4)

This invention relates to a manually operated lubricant gun or lubricant feeding device and has particular reference to that type of device in which the lubricant is forced under pressure to a bearing, or the like, by forcing or thrusting the device toward the part or bearing to be lubricated. This type of lubricant gun includes, essentially, a lubricant container and an ejecting mechanism, the general type of device referred to being such as is disclosed in the patent to Gustafson, No. 784,788, issued March 14, 1905.

It is a general object of the present invention to provide a lubricant handling device of the character mentioned involving a simplified and improved arrangement and construction of parts. By the arrangement and construction provided by this invention, the device is made simple and inexpensive of manufacture and also convenient and practical for general use.

Another object of this invention is to provide improvements in the ejector of a device of the character referred to whereby the ejector is simple of construction and efficient and dependable in operation. In the construction provided by the invention the body of the ejector is related to the container of the device so that it can be advantageously formed or cast integrally therewith. The body of the ejector is further characterized by a removable liner or wearing part which fits the plunger of the ejector and can be readily exchanged with the plunger for corresponding parts of different sizes to vary the action of the gun. By providing a removable liner we gain a simple and inexpensive body construction and a finished or accurately fitted part to cooperate with the plunger, which part may be formed of a material particularly suited for cooperation with the plunger.

Another object of this invention is to provide a lubricant handling device of the type mentioned involving a simplified and improved inlet valve. The present invention provides a large positive acting inlet valve which readily admits lubricant into the ejector. The valve is in the form of a unit that can be detached from the other parts of the mechanism for purpose of replacement or repair.

Another object of this invention is to provide a lubricant handling device of the character mentioned in which the lubricant from the receptacle enters the ejector directly from the receptacle and is not passed through tubes, passages or other parts or restrictions tending to build up the internal resistance of the device. By the present invention the ejector is confined to the extreme forward end of the lubricant receptacle so that the lubricant enters the ejector at the forward end of the receptacle and passes directly from the ejector to the part or parts to be lubricated or designed to receive the lubricant. By eliminating feeding tubes, passages or other such parts and by confining the ejecting mechanism to the extreme forward end of the receptacle, the lubricant is handled by the device with a minimum of resistance.

Another object of the present invention is to provide a lubricant handling device of the character mentioned in which the flow or circulation of lubricant within the device is uni-directional. In the devices heretofore provided employing the characteristic features of the Gustafson patent, hereinabove mentioned, the lubricant has had to flow in several directions or has even had to reverse its direction of flow in the course of being handled by the device. By providing a construction in which there is a uni-directional flow of lubricant, heavy or viscous lubricants can be handled efficiently and with a minimum of effort upon the part of the operator.

Another object of the present invention is to provide a device of the character mentioned in which the lubricant container is equipped with a follower. A feature of the invention is the arrangement and combination of parts whereby the follower is operable in the container and is totally free from the ejector so that it can operate within the container to accommodate the lubricant and without restriction or dependence upon the action of the ejector. In the arrangement provided by the present invention, the follower is adapted to be fed by fluid pressure so that it confines the lubricant within the container forward of the follower and is effective in keeping the inlet valve of the ejector flooded to insure complete charging of the ejector.

Another object of the present invention is to provide a lubricant handling device of the character just referred to in which the follower is of simple form, is such as to effectively seal against pressure in a single direction, and is connected with the container, for instance, with the detachable cap of the container, to be removable from the other parts of the device with the cap. The follower, being structurally confined to the container and being entirely independent of the ejector, can be repaired or replaced without in any way disturbing or interfering with the ejector and, in fact, it may be eliminated from the device if it is not desired.

Another object of the present invention is to provide a device of the character mentioned which involves a completely closed or sealed construction. The device of the present invention preferably depends upon super-atmospheric pressure carried within the device for insuring feed of lubricant to the ejector and also to effect the return of the ejector to the unactuated position following each operation. The construction is such that it is in no way dependent upon, or is its action in any way varied or influenced by, leakage of atmospheric pressure between relatively working parts.

Another object of the present invention is to provide a device of the character hereinabove referred to which is entirely free of springs, or the like, and is, therefore, more certain and dependable in operation than devices heretofore provided which depend upon the action of springs, either for the operation of the ejector or for purpose of feeding lubricant to the ejector. Spring operated devices, either ejecting devices or feeding devices, are of necessity restricted or limited in their action by the character or strength of the springs involved and they are only efficient under limited conditions and are not flexible or universally practical. Further, springs sufficiently large or strong to be effective add weight and size to the device. By the present invention, the return of the ejector to normal position and the feed of lubricant is effected by fluid pressure, as for instance, by compressed air, and the operator can put the device under various degrees of pressure depending upon the character of lubricant being handled or the manner in which he wishes the device to function. It will be obvious that only limited force can be obtained in a device of the character under consideration through springs, whereas through the action of compressed air, very high pressures can be obtained if desired. Further, spring actuated structures such as ejectors or feeding means are fundamentally different from the fluid pressure feeding means provided by the present invention in that the action of spring means varies and decreases as the spring element or elements become extended, whereas with the fluid pressure means of the present invention, the pressure can be varied, either decreased or increased, from time to time during the course of emptying a container of lubricant in accordance with the wishes of the operator.

Another object of the present invention is to provide a lubricant handling device of the character mentioned in which the outlet valve of the ejector is located at the extreme forward or outer end of the stem of the ejector plunger so that the lubricant handled by the device passes directly from the ejector to the part to be lubricated, or to the device designed to receive the lubricant, and does not have to flow through a discharge tube, duct or other element such as would necessarily operate to retard the flow of lubricant. Further, by this feature of the invention, there is only a very small amount of lubricant, namely, that small amount of lubricant contained in the outlet valve cage ahead of the outlet valve proper, which can drain or spill from the device when the device is not in use. In contrast, in constructions in which there is a duct or tube extending forward a substantial distance from the ejector, for instance, when the ejector is located within the container or removed from the extreme forward end of the container, there is a substantial volume of unconfined lubricant ahead of the discharge valve in an outlet tube, which lubricant will flow or drip from the device.

The various objects and features of our invention will be fully understood from the following detailed description of a typical form and application of the invention, throughout which description reference is made to the accompanying drawing, in which:

Fig. 1 is a longitudinal central detailed sectional view of a device embodying the structure of the present invention. Fig. 2 is an enlarged view of certain parts shown in Fig. 1. Fig. 3 is a modified view showing the device equipped with an attachment such as may be used under certain circumstances during the course of operating the device. Fig. 4 is an enlarged detailed transverse sectional view taken as indicated by line 4—4 on Fig. 1. Fig. 5 is an enlarged detailed transverse sectional view taken as indicated by line 5—5 on Fig. 1 and Fig. 6 is an enlarged detailed transverse sectional view taken as indicated by line 6—6 on Fig. 1.

The device of the present invention includes, generally, a receptacle or container A, an ejector B for handling lubricant received from the container A, a follower C operable in the container A and a handle D by which the device can be conveniently manipulated and embodying features of construction which will be hereinafter described.

The container A is an elongate structure including a tubular body 10, a forward end 11 and a rear end or cap 12. The forward end 11 of the body is preferably formed integral with the cylinder 10 and is tapered to project forward from the body 10 as clearly illustrated in Fig. 1 of the drawing. The cap 12 of the container is preferably detachable from the body 10 as, for instance, through a suitable threaded connection 13 so that it can be removed to facilitate filling lubricant into the body 10. It will be obvious that the container A may be varied considerably in size and shape. The container being a comparatively large element of the device, it is preferred to arrange it so that it is coaxial with the major axis of the device and it is desirable to proportion it so that the device is comparatively long and shaped so that it will conveniently reach parts to be lubricated such as lubricating fittings on motor vehicles, or the like.

The cap 12 may be a simple cover or cap provided with threads for engagement with the body 10 of the container. The cap closes the rear end of the container and provides a convenient element to which the handle may be applied. Further, in accordance with the present invention, the cap 12 forms a part with which the follower C is associated, as will be hereinafter described. In accordance with the present invention, fluid pressure, for instance, air under pressure, is utilized to effect feed of lubricant to the ejector and the fluid under pressure is carried in the rear end of the cylinder 10 and in the handle D. The cap is adapted to be tightly fitted to the body 10 to make a fluid-tight connection; for instance, in practice, a suitable gasket or washer 15 is provided in the cap to engage the end of the body 10 to make a sealed connection between the cap and body when the cap is tightened onto the body.

The handle D is located at the rear end of the device and has a hollow body 16 in the form of a pistol grip adapted to be conveniently grasped by the operator and adapted to form a reservoir or chamber to carry air under pressure. Spaced webs 17 and 18 join the body 16 with the cap so that the handle is suitably spaced from the cap and is disposed at a suitable angle with relation to the cap. In the preferred construction, the cap 12, the body 16 of the handle, and the webs 17 and 18 are in the form of a single unit or casting. The lower end of the handle body 16 is closed by a wall 19 and an opening is provided through the wall 19. A suitable fitting 21 is provided in the opening for receiving a conduit through which compressed air, or the like, may be admitted into the handle. A control valve 22 is included in the fitting 21 adapted to receive compressed air from an air hose, or the like, such as is used in filling the tires of motor vehicles. In the preferred construction, the wall 19 is spaced somewhat inwardly from the extreme lower end of the handle body 16 so that the fitting 21 and the valve 22 do not project from the handle so that they are subject to being injured or so that they interfere with the free operation of the device. Compressed air admitted into the handle D is supplied to the rear end of the receptacle A through one of the ribs which joins the handle D with the cap 12. In the construction illustrated, the upper-most rib 17 is provided with a port 23 which connects the interior of the handle with the rear end portion of the lubricant receptacle. The handle D illustrated in the drawing is formed with an opening in the upper end of the body 16 to facilitate casting, the opening being tightly closed by a suitable cover 24. Spaces may be provided on the sides of the handle body to receive name plates, or the like.

The ejector B is arranged in communication with the container A at the extreme forward end of the container. The follower C is provided in the body 10 of the container A and is adapted to operate through the body 10 to confine the lubricant within the body 10 and to urge the lubricant forward in the body to the ejector when fluid pressure is applied to the device through the construction above described. The follower is preferably a simple device including a body 26 of packing carried between a pair of plates 27 and provided with a peripheral flange 28 which fits the interior of the container body 10. The flange 28 faces rearwardly so that it is effective in sealing against escape of air forward in the container past the follower.

In accordance with the present invention the follower C is associated or coupled with the cap 12 to be removable from the other parts of the device at the rear of the device and with the cap. The follower may be connected with the cap in various manners, it being preferred to provide a rod 30 to carry the follower and to connect the rod with the cap 12. In the construction illustrated, the rod 30 is connected to a suitable boss 31 on the inner side of the cap 12 so that when the cap is on the body 10 the rod projects centrally through the body 10 to a point near the forward end of the body. For economy and in order to reduce the weight of the device, the rod 30 is made hollow. The body 26 of the follower C has a central opening passing the rod 30 and is provided with a central axially projecting flange 33 which seals around the rod in the same manner that the flange 28 seals in the body 10. A suitable stop 34 is provided at the forward end of the rod 30 to prevent the follower from becoming displaced from the rod. When the rod is tubular, as shown in the drawing, the stop 34 may be in the form of a head on a plug 36 screw threaded or otherwise applied to the end of the rod. In practice, it is desirable to provide the plug 36 with a portion 37 of reduced diameter to break the seal between the follower and rod when the follower reaches the end of its stroke in order to prevent the air under pressure in the body 10 behind the follower from continuing to force the follower forward when the follower is stopped against forward motion. Breaking of the seal around the rod also facilitates removal of the follower from the container.

The ejector B provided by this invention is located at the extreme forward end of the container 10 so that it receives lubricant directly from the container and discharges it directly to the point or part to which the device is applied. This is an important feature of the present invention as it eliminates ducts or tubes which offer resistance to the lubricant. The ejector includes, generally, a body 40 joining the forward end 11 of the container to project forward therefrom, a tubular plunger 41 operable in the body 40, an inlet valve 42 at the extreme inner end of the body and an outlet valve 43 at the extreme outer end of the plunger. The body 40, in accordance with the preferred form of the invention, is formed integral with the container so that it is, in effect, a forwardly extending projection or extension of the forward end 11 of the container.

The plunger 41 is designed to reciprocate in the body and is preferably formed so that its rear end portion is finished to closely fit in the body while its forward end portion 46 is in the form of a stem which moves in and out of the forward end of the body. The present invention provides the body 40 with a removable liner 47 which slidably receives the rear end portion of the plunger 41. The liner 47 is arranged in the body 40 from its rear end and is preferably threaded into a counter-bore or enlarged opening 48ª in the rear end of the body 40. The liner projects forward in the body 40 a substantial distance and is sufficiently long to accommodate the stroke of the plunger 41. In practice action or pressure of the device can be changed by changing the size of the liner and plunger. Packing is provided for making a sealed connection between the body 40 or liner 47 and the plunger 41. In the construction illustrated, an annular plate 48 is arranged within the body 40 ahead of the forward end of the liner 47 so that it surrounds the plunger 41 and seats against a suitable shoulder 49 provided in the body 40. A suitable packing 50 is arranged against the plate 48 and is held in suitable engagement with the plate by a retaining ring 51 held in place by the forward end of the liner 47. The packing 50 may be in the nature of a cup leather, or the like, having flange parts which fit and seal in the opening 55ª of the body 40 and around the plunger 41, as clearly illustrated in Fig. 2 of the drawing. With the construction just described, the packing means is assembled in the ejector ahead of the liner 47 and the liner is threaded into the opening 48ª in the body 40 so that the packing means is secured in operating position.

The plunger 41 is a hollow or tubular member having an opening 60ª extending continuously through it from one end to the other. The rear end portion of the plunger operates through the packing and into the liner hereinabove described, while the stem portion 46 operates in the forward guide portion 51 of the body 40. The guide portion 51 of the body is counter-bored so that it has bearing engagement with the stem 46 of the plunger only at its forward end. A split stop collar 55 is provided on the stem 46 at its inner end and operates in the guide portion of the body. The collar 55 cooperates with the extreme forward end portion of the guide 51 so that the plunger cannot become displaced from the body.

The inlet valve 42 is provided at the extreme inner end of the ejector body 40 to communicate with the interior of the container A so that it operates to admit lubricant from the container into the liner 47 from which it passes forward through the plunger 41. The valve 42 illustrated in the drawing is a disc-type of valve carried in a cage 60 to control the opening 61 in the cage. The cage is screw threaded into the opening 48ª in the rear of the ejector body 40 and carries a spring 62 which normally holds the valve 42 seated so that the opening 61 is closed. The spring 62 is confined under compression between the valve 42 and a suitable spring holder 63 secured to the cage 60 by a flange 64 provided on the forward end of the cage. It is to be noted that the valve construction just described is comparatively large and that it is in the form of a unit that can be readily detached from the other parts of the device for purpose of repair or replacement. To insure a tight connection or mounting of the valve unit in the rear end portion of the ejector body, the cage 41 may be provided with a radial flange 70 and a suitable washer 71 may be provided between the flange 70 and the rear end face of the ejector body, as clearly illustrated in Fig. 2.

The outlet valve 43 is arranged in the extreme forward end of the plunger 41. The valve 43, illustrated in the drawing, is a ball valve arranged to cooperate with a suitable seat provided in the opening 60ª through the plunger. The valve 43 is held in cooperation with its seat by a suitable spring 72, the spring being held in place by an annular retaining member or ring 73 threaded into the extreme forward end of the plunger.

The plunger is adapted to be operated in the body 40 by the operator applying the forward end of the plunger to a part to receive lubricant and then pressing or thrusting forward on the container A. Various fittings or devices may be provided on the forward end of the plunger to accommodate this type of operation. In the case illustrated in Fig. 1, a sealing washer 80 of leather, or the like, is applied to the extreme forward end of the plunger 41 and a retaining cap 81 is screw threaded onto the forward end of the plunger to retain the washer 80 in place. When it is desired to apply the lubricant to a part not directly in line with the device, for instance, to a part that may be somewhat inaccessible, it is sometimes advantageous to apply an angle fitting or elbow 85 to the forward end of the plunger. In Fig. 3 the plunger 41 is shown equipped with an angle fitting 85, the fitting being secured to the forward end of the plunger by a coupling sleeve 86. A suitable washer 87 is provided between the angle fitting and the forward end of the plunger 41 to make a tight connection between the parts. The forward end of the angle fitting 85 may correspond to the forward end of the plunger 41, in which case a washer 80ª, corresponding to the washer 80, may be held in place on the fitting by a cap 81ª, corresponding to the cap 81, hereinabove described. When an angle fitting or other attachment is used in connection with the device, it may be desirable to fit the plunger 41 of the ejector against rotation in the body of the ejector. In practice, it is convenient to form the stem 46 and the opening in the forward end of the guide part 51 of the body so that these parts are guided for relative longitudinal movement but are held or locked together against relative rotation. In the construction illustrated, the stem 46 of the plunger has flat sides 90 and the opening in the forward end of the body guide 51 is shaped to conform to the cross sectional configuration of the stem, as clearly illustrated in Fig. 6.

With the device of the present invention, the cap 12 is removed from the body 10 of the container so that lubricant can be conveniently filled into the container. When the cap is removed, the handle D and the follower C with its guide rod 30 are removed with it, leaving the body 10 open and unrestricted so that it is convenient to handle and can be readily filled with lubricant. When the lubricant has been applied to the body, the cap 12 is returned to its position on the rear end of the body in the course of which operation the guide rod 30 enters the lubricant within the body and tends to displace lubricant rearwardly in the body and against the plunger, the plunger being free to slide rearwardly on the guide rod 30 as the parts are being assembled. When the container has been filled and the cap arranged in place, the operator applies a charge of fluid pressure to the device, for instance, the charging valve 22 is engaged by the fitting on the end of an air hose long enough so that air under pressure is admitted into the handle D through the port 23 and into the rear of the container A behind the follower to establish the desired pressure on the lubricant in the container. The operator can put any desired pressure on the body within the limits of the structure depending upon the action desired and upon the character of lubricant being handled. The air under pressure acts on the follower C to urge it forward in the body 10 of the container. The lubricant is thus urged or made to flow forward so that the forward end of the body is filled and the valve 42 forced open so that the lubricant enters the liner 47 and the plunger 41. The spring 72 which holds the valve 43 against its seat is a comparatively stiff or heavy spring and the valve 43 is small and, therefore, the lubricant urged by the air applied through the handle D will not open the valve. The flow of lubricant outwardly through the plunger being stopped by the valve 43, the air pressure acting through the follower C causes the plunger 41 of the ejector to move forward to the extent of its stroke. When the plunger reaches the forward end of its stroke, the ejector is completely charged and the device is ready for operation. If an attempt is made to apply an excessive pressure to the device by means of fluid admitted through the handle D, the valve 43 will open against the resistance of spring 72 and allow lubricant to escape from the forward end of the plunger without injuring the device or endangering the operator.

When the device is charged, and ready for operation, the operator grips the handle D and applies the forward end of the plunger 41 to the part or fitting to be lubricated. The fitting is preferably such as to engage the washer 80 and thus establish a tight connection with the plunger. As the operator applies a forward thrust or pressure upon the handle D, the plunger 41 being in engagement with the fitting to be lubricated cannot move forward and, therefore, the container A carrying the body 40 of the ejector moves forward relative to the plunger 41. This relative movement between the plunger 41 and the body 40 of the ejector causes lubricant in the ejector to be trapped by the valve 42 and discharged forward past the valve 43 and directly from the plunger into the fitting to be lubricated. This discharge of lubricant will continue until the body 40 of the ejector has moved forward and the plunger stem 46 is entirely within the guide part 51 of the body 40. When the operator relieves the pressure or thrust from the handle D or disengages the plunger 41 from the fitting being lubricated, the air pressure confined in the device acting on the follower C causes the ejector to be recharged and the plunger 41 to move forward to the position shown in Fig. 1, whereupon the device is ready for another operation. This manner of operating the device can be repeated and as the follower C moves forward in the container A, the lubricant is confined in the forward portion of the container and it is effectively fed to the ejector. If a heavy lubricant is being handled by the device or if the action of the device is not rapid enough, additional pressure may be applied and the action of the device speeded up by periodically admitting air under pressure to the device through the valve 22.

It is to be noted that the pressure applied to the follower urges the lubricant forward and tends at all times to open the inlet valve and charge the ejector. The inlet valve being of the type hereinabove described opens at any time that the pressure in the container exceeds that in the ejector and thus insures efficient charging of the ejector and makes it impossible to develop pressure in the container beyond that which is held by the outlet valve of the ejector. Excessive pressure applied to the container causes lubricant to discharge from the ejector regardless of the operative position of the plunger in the body of the ejector.

Having described only a typical form and application of our invention, we do not wish to be limited or restricted to the specific form and application herein set forth, but wish to reserve to ourselves any modifications or variations that may appear to those skilled in the art or fall within the scope of the following claims.

Having described our invention, we claim:

1. A lubricant gun of the character described including, an elongate lubricant container, a follower in the container, an ejector at the forward end of the container for handling lubricant from the container, a removable cap closing the rear end of the container, and a handle integral with the cap, the handle being hollow and closed to form a reservoir for fluid under pressure, there being a fluid passage connecting the interior of the handle and the container admitting fluid under pressure to the container to act on the follower, and means for admitting fluid under pressure into the handle.

2. A lubricant gun of the character described including, an elongate lubricant container, an ejector at the forward end of the container for handling lubricant from the container, a cap, means detachably connecting the cap to the rear end of the body to close the same, and a handle permanently secured to the cap, the handle being hollow and closed to form a reservoir for fluid under pressure there being a fluid passage connecting the interior of the handle with the container to feed lubricant, and means for admitting fluid under pressure into the handle.

3. A lubricant gun including, an elongate lubricant container, a follower in the container for feeding lubricant forward therein, a detachable cap at the rear end of the container, a rod projecting from the cap and through the container to slidably carry the follower, a hollow handle permanently secured to the cap to carry fluid under pressure and being in communication with the container rearward of the follower, and an ejector at the forward end of the container including, a tubular body directly permanently carried by the container, an inlet valve at the inner end of the body, and a valved tubular plunger operable in the body.

4. A lubricant gun including, an elongate lubricant container, and an ejector at the forward end of the container including, a tubular body integral with the container, an inlet valve at the extreme inner end of the body, a detachable liner in the body, a tubular plunger extending into the body and fitting the liner, packing means between the body and the plunger, and an outlet valve at the forward end of the plunger.

5. A lubricant gun including, an elongate lubricant container, and an ejector at the forward end of the container including a tubular body integral with the container, an inlet valve at the extreme inner end of the body, a detachable liner in the body, a tubular plunger extending into the body and fitting the liner, packing means at the forward end of the liner between the body and the plunger, and an outlet valve at the forward end of the plunger.

6. A lubricant gun including, an elongate lubricant container, and an ejector at the forward end of the container including, a tubular body integral with the container, an inlet valve at the extreme inner end of the body, a liner in the body, a tubular plunger extending into the body and fitting the liner, and an outlet valve at the forward end of the plunger, the body having a portion projecting forward from the liner to have shiftable guiding engagement with the outer portion of the plunger.

7. A lubricant gun including, an elongate lubricant container, a cap removably secured to the rear end of the container, an ejector carried by the forward end of the container, a follower operable in the container, a rod on the cap shiftably guiding the follower and having a part to engage and withdraw the follower upon removal of the cap, and a hollow handle permanently connected with the cap and communicating with the interior of the container to supply superatmospheric pressure thereto.

NEIL V. SMITH.
CARL W. STOLL.